(12) United States Patent
Park et al.

(10) Patent No.: US 12,731,843 B2
(45) Date of Patent: Sep. 8, 2026

(54) BATTERY MODULE, BATTERY PACK COMPRISING SAME, AND VEHICLE

(71) Applicant: LG ENERGY SOLUTION, LTD., Seoul (KR)

(72) Inventors: Jin-Yong Park, Daejeon (KR); Hang-June Choi, Daejeon (KR); Dal-Mo Kang, Daejeon (KR); Jeong-O Mun, Daejeon (KR); Yong-Il Kim, Daejeon (KR); Ho-June Chi, Daejeon (KR); Su-Hang Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 625 days.

(21) Appl. No.: 17/927,566

(22) PCT Filed: Sep. 17, 2021

(86) PCT No.: PCT/KR2021/012858
§ 371 (c)(1),
(2) Date: Nov. 23, 2022

(87) PCT Pub. No.: WO2022/065841
PCT Pub. Date: Mar. 31, 2022

(65) Prior Publication Data

US 2023/0207941 A1 Jun. 29, 2023

(30) Foreign Application Priority Data

Sep. 22, 2020 (KR) ........................ 10-2020-0122440

(51) Int. Cl.
*H01M 50/242* (2021.01)
*H01M 10/653* (2014.01)
(Continued)

(52) U.S. Cl.
CPC ....... *H01M 50/242* (2021.01); *H01M 10/653* (2015.04); *H01M 50/211* (2021.01); *H01M 50/264* (2021.01)

(58) Field of Classification Search
CPC ............. H01M 50/211; H01M 50/242; H01M 50/264; H01M 10/653
(Continued)

(56) References Cited

U.S. PATENT DOCUMENTS 9,969,296 B2 5/2018 Kim et al.
2012/0107678 A1 5/2012 Kim et al.
(Continued)

FOREIGN PATENT DOCUMENTS

CN 206849914 U 1/2018
CN 211265561 U 8/2020
(Continued)

OTHER PUBLICATIONS

Extended European Search Report for European Application No. 21872869.9, dated Nov. 6, 2023.
(Continued)

*Primary Examiner* — Kevin P Kerns
(74) *Attorney, Agent, or Firm* — Birch, Stewart, Kolasch & Birch, LLP

(57) ABSTRACT

A battery module prevents performance degradation due to a swelling phenomenon caused by charging and discharging and increases durability. The battery module includes a cell assembly including a plurality of battery cells stacked in a left-right direction; and a module housing configured to accommodate the cell assembly therein. The module housing includes an upper plate covering an upper portion of the cell assembly, a left plate covering a left portion of the cell assembly, a right plate covering a right portion of the cell assembly, and a lower plate covering a lower portion of the
(Continued)

cell assembly, and at least one of the left plate and the right plate includes a support portion having a shape protruding toward the cell assembly from an inner surface facing the plurality of battery cells to pressurize at least a part of the cell assembly with a relatively small volume expansion.

14 Claims, 13 Drawing Sheets

(51) Int. Cl.
*H01M 50/211* (2021.01)
*H01M 50/264* (2021.01)

(58) Field of Classification Search
USPC .......................................................... 429/120
See application file for complete search history.

(56) References Cited

U.S. PATENT DOCUMENTS

| | | | |
|---|---|---|---|
| 2015/0214570 | A1 | 7/2015 | Deponte et al. |
| 2016/0049619 | A1 | 2/2016 | Yong et al. |
| 2017/0110695 | A1 | 4/2017 | Nishikawa et al. |
| 2018/0062127 | A1 | 3/2018 | Lee |
| 2019/0267591 | A1 | 8/2019 | Park et al. |
| 2020/0373625 | A1 | 11/2020 | Ono et al. |
| 2020/0388805 | A1 | 12/2020 | Yoo et al. |
| 2021/0020879 | A1 | 1/2021 | Lee |
| 2021/0057689 | A1 | 2/2021 | Park et al. |
| 2021/0242525 | A1 | 8/2021 | Lee et al. |
| 2021/0344057 | A1 | 11/2021 | Seo et al. |

FOREIGN PATENT DOCUMENTS

| | | | |
|---|---|---|---|
| JP | 2010-80396 | A | 4/2010 |
| JP | 2014-10983 | A | 1/2014 |
| JP | 2015-207553 | A | 11/2015 |
| JP | 2016-72115 | A | 5/2016 |
| JP | 2020-68103 | A | 4/2020 |
| KR | 10-2012-0047196 | A | 5/2012 |
| KR | 10-2016-0020062 | A | 2/2016 |
| KR | 10-2018-0025643 | A | 3/2018 |
| KR | 10-1853526 | B1 | 4/2018 |
| KR | 10-2018-0113416 | A | 10/2018 |
| KR | 10-1916720 | B1 | 11/2018 |
| KR | 10-2020-0030964 | A | 3/2020 |
| KR | 10-2020-0068479 | A | 6/2020 |
| KR | 10-2020-0077296 | A | 6/2020 |
| WO | WO 2019/021778 | A1 | 1/2019 |
| WO | WO 2019/054114 | A1 | 3/2019 |
| WO | WO 2020/055005 | A1 | 3/2020 |
| WO | WO 2020/101209 | A1 | 5/2020 |
| WO | WO 2020/145549 | A1 | 7/2020 |

OTHER PUBLICATIONS

International Search Report (PCT/ISA/210) issued in PCT/KR2021/012858 mailed on Dec. 30, 2021.

BATTERY MODULE, BATTERY PACK COMPRISING SAME, AND VEHICLE

TECHNICAL FIELD

The present disclosure relates to a battery module, a battery pack and a vehicle, each including the battery module, and more particularly, to a battery module that prevents performance degradation due to a swelling phenomenon caused by charging and discharging and increases durability.

The present application claims priority to Korean Patent Application No. 10-2020-0122440 filed on Sep. 22, 2020 in the Republic of Korea, the disclosure of which is incorporated herein by reference.

BACKGROUND ART

Currently commercialized secondary batteries include nickel cadmium batteries, nickel hydrogen batteries, nickel zinc batteries, lithium secondary batteries, etc. Among these secondary batteries, because the lithium secondary batteries have almost no memory effect compared to nickel-based secondary batteries, the lithium secondary batteries have been spotlighted owing to advantages of free charging and discharging, a very low self-discharge rate, and a high energy density.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the assembly together with an electrolyte solution.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected in order to increase capacity and output power. In particular, pouch type secondary batteries are widely used in such medium large devices because of advantages such as easy lamination.

Meanwhile, as the need for a large-capacity structure, including its use as an energy storage source, recently increases, demand for a plurality of cell assemblies including a plurality of secondary battery cells electrically connected in series and/or parallel, and a battery module accommodating the plurality of cell assemblies therein is increasing.

In addition, a module housing made of a metal material is generally provided in such a battery module so as to protect or accommodate and store a plurality of secondary batteries from external impact. Meanwhile, demand for high-capacity battery modules is increasing recently.

However, in the battery module of the related art, a swelling phenomenon may occur according to charging and discharging of a cell assembly. For example, a phenomenon in which the volume of such a cell assembly increases in a direction in which a plurality of battery cells are stacked and then contracts again to the center of the cell assembly is repeated according to charging and discharging.

When the battery module of the related art is overcharged, a battery case of each battery cell constituting the cell assembly may be severely swollen and pressurize other adjacent battery cells. Accordingly, the battery cells may be moved by pressurization according to the volume expansion of each of the plurality of battery cells of the cell assembly. In this case, the amount of movement of the battery cells may be accumulated and increased as the battery cell is located outside a stacking direction with respect to the center of the cell assembly. That is, the outermost battery cell may have the greatest amount of movement to the outside due to the swelling phenomenon of the cell assembly. In such a cell assembly, as the swelling phenomenon is repeated, the arrangement of the plurality of battery cells is in disorder, and an electrical disconnection could occur between bus bars electrically connected to the plurality of battery cells.

Furthermore, when the cell assembly is fixed to a module housing, the fixed battery cell is forcibly moved according to the swelling phenomenon of the cell assembly, which may cause a problem such as damage to the battery case.

In addition, when a volume expansion amount of a middle part of the cell assembly is greater than that of an upper part or a lower part according to charging and discharging, because the middle part of the cell assembly may be intensively pressurized by an inner surface of the module housing, damage to an electrode assembly inside the battery cell tended to be severer. Accordingly, in the battery module of the related art, there is a problem in that the battery performance and lifespan of the cell assembly deteriorate.

DISCLOSURE

Technical Problem

The present disclosure is designed to solve the problems of the related art, and therefore the present disclosure is directed to providing a battery module that prevents performance degradation due to a swelling phenomenon caused by charging and discharging and increases durability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a cell assembly comprising a plurality of battery cells stacked in a first direction; and a module housing configured to accommodate the cell assembly therein. The module housing includes an upper plate covering an upper portion of the cell assembly, a left plate covering a left portion of the cell assembly, a right plate covering a right portion of the cell assembly, and a lower plate covering a lower portion of the cell assembly, and at least one of the left plate and the right plate includes a support portion having a shape protruding toward the cell assembly from an inner surface facing the plurality of battery cells to pressurize at least a part of the cell assembly having a smaller volume expansion than a remainder of the cell assembly.

The support portion may be provided on at least one of a lower portion and an upper portion of at least one of the left plate and the right plate.

The support portion may be configured to have a shape that a protruding length gradually increases as the support portion is closer to the lower plate or the upper plate.

The battery module may further include an adhesive having a thermal conductivity. The battery module may be applied to fix one or more of an upper surface and a lower surface of the cell assembly to an inner surface of the module housing.

The support portion may protrude toward a part of a first battery cell of the plurality of battery cells, the first battery cell being located at an outermost side in the first direction and fixed by the adhesive.

The module housing may include a recess portion formed as a part of the module housing facing a part of the cell assembly having a volume expansion during charging and discharging which is larger than a remainder of the cell assembly.

The module housing may further include an elastic pad disposed to surround at least a part of an outer surface of the cell assembly and configured to be deformed according to a volume contraction and a volume expansion of the cell assembly, wherein at least a part of the elastic pad is interposed between the support portion of the module housing and the cell assembly.

The elastic pad may include a pressurizing portion having a part formed to protrude toward the cell assembly to pressurize the part of the cell assembly with the smaller volume expansion on an inner surface facing the plurality of battery cells during charging and discharging.

The module housing may further include a tube filled with a fluid, the tube configured to allow the fluid to move toward the part of the cell assembly with the smaller volume expansion during charging and discharging.

In another aspect of the present disclosure, there is provided a battery pack including at least one battery module described above.

In another aspect of the present disclosure, there is provided a vehicle including at least one battery module described above.

The support portion may be a concave surface of at least one of the left plate and the right plate facing the cell assembly.

Advantageous Effects

According to an aspect of the present disclosure, in the battery module of the present disclosure, because the support portions are respectively provided on the left plate and the right plate, when the volume expansion of the cell assembly occurs, the left plate and the right plate may uniformly pressurize left and right surfaces of the cell assembly in which the swelling phenomenon has occurred, thereby preventing the volume expansion. That is, in the present disclosure, the support portions are provided to pressurize a specific part of the cell assembly with the relatively small amount of movement according to the volume expansion of the cell assembly, and thus each of the left plate and the right plate may uniformly pressurize the cell assembly and prevent the volume expansion. Accordingly, the present disclosure may prevent deterioration of the battery performance and battery life of the battery module because the volume expansion is relatively large due to the swelling phenomenon of the cell assembly or pressurization is concentrated on a specific part of the cell assembly where the volume expansion is concentrated as in the related art.

According to another aspect of the present disclosure, the support portion of the left plate and/or the support portion of the right plate of the present disclosure protrudes toward a part of the outermost located battery cell fixed by the adhesive, thereby effectively blocking the movement of the outermost located battery cell with the largest accumulated amount of movement due to the swelling phenomenon of the cell assembly. Accordingly, when the lower portion of the cell assembly is bonded by the adhesive, it is possible to effectively prevent a part of the case of the battery cell fixed by the adhesive force of the adhesive from being damaged (torn off) while the battery cells located outside move with respect to the center along with the volume increase of the cell assembly due to the swelling phenomenon. In particular, the present disclosure may block the movement of the outermost located battery cell by the support portion, thereby effectively preventing a problem in which the part fixed by the adhesive is torn off and bursts while the plurality of battery cells are moved according to the swelling phenomenon, in the case of the pouch-type battery cell having the soft pouch with the relatively small mechanical rigidity as compared to a metal case as the battery case.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
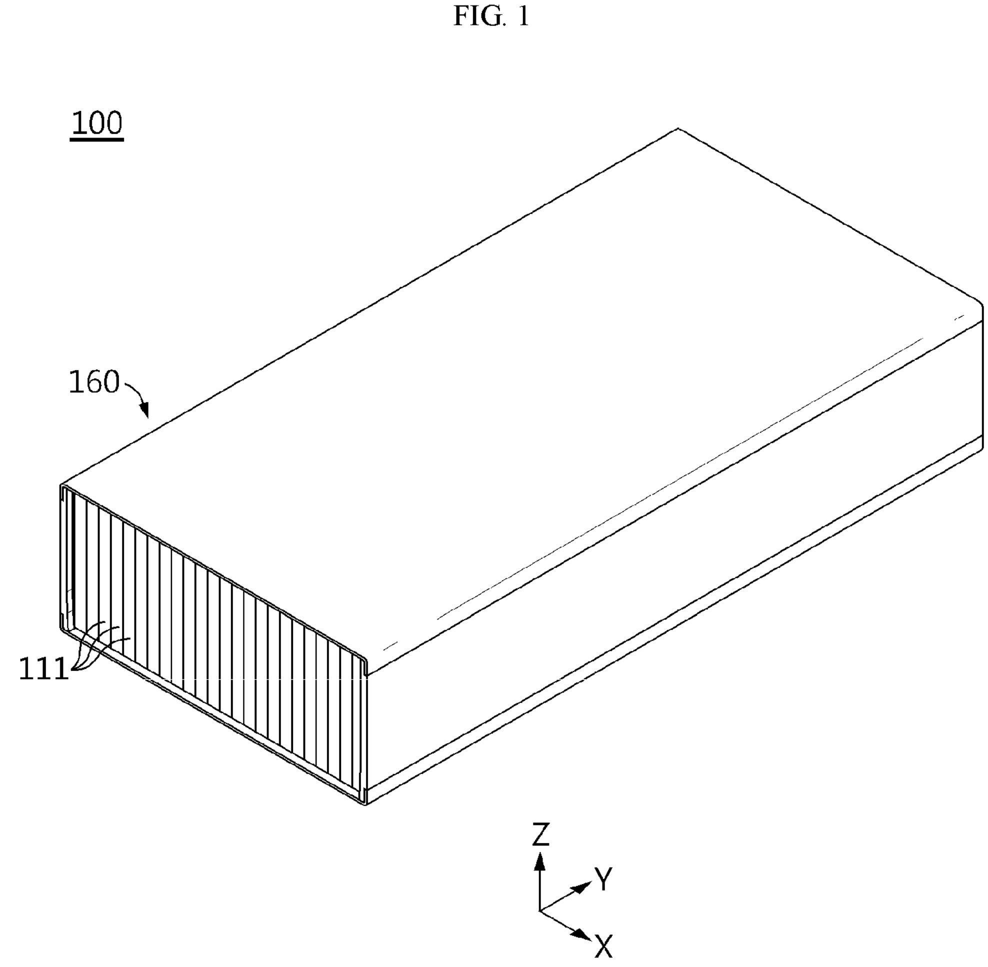
FIG. 1 is a perspective view schematically illustrating a battery module according to an embodiment of the present disclosure.
Figure 2:
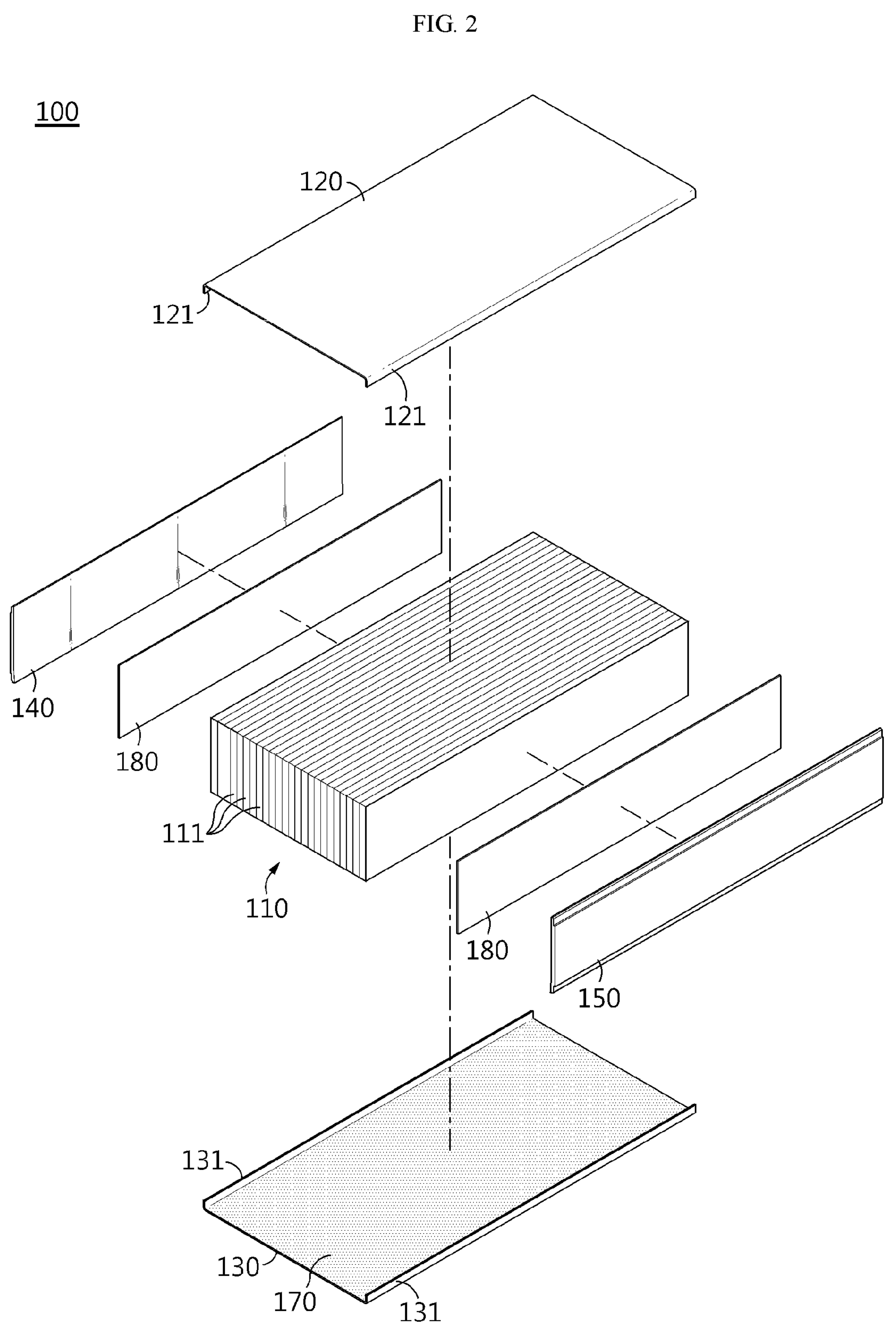
FIG. 2 is an exploded perspective view schematically illustrating configurations of a battery module according to an embodiment of the present disclosure.
Figure 3:
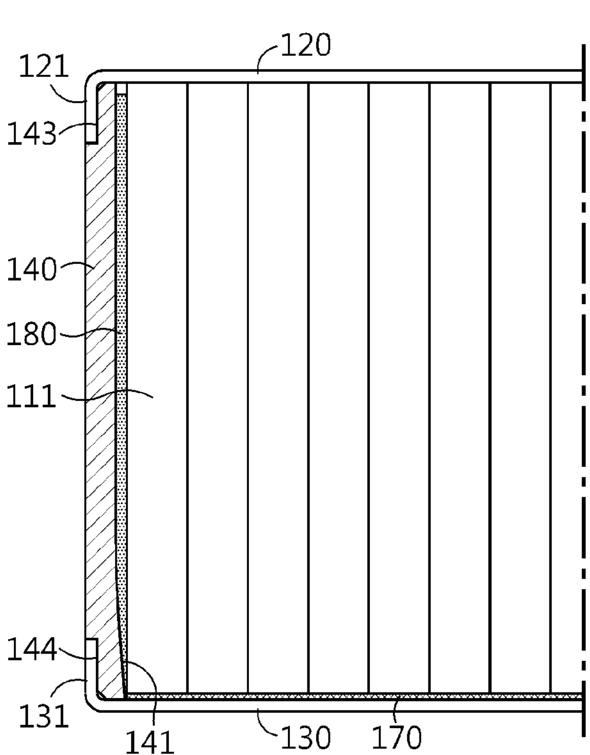
FIGS. 3 and 4 are partial front views schematically illustrating a battery module according to an embodiment of the present disclosure.

FIG. 1 is a perspective view schematically illustrating a battery module according to an embodiment of the present disclosure. FIG. 2 is an exploded perspective view schematically illustrating configurations of the battery module according to an embodiment of the present disclosure. FIG. 3 is a partial front view schematically illustrating the battery module according to an embodiment of the present disclosure.

Referring to FIGS. 1 to 3, a battery module 100 according to an embodiment of the present disclosure includes a cell assembly 110 including a plurality of battery cells 111, and a module housing 160.

Specifically, the battery cell 111 may be a pouch-type battery cell 111 having an electrode assembly (not shown), an electrolyte (not shown), and a pouch accommodating the electrode assembly and the electrolyte therein. Alternatively, the battery cell 111 may have an approximately rectangular parallelepiped battery case. Furthermore, the battery cell 111 may include a positive electrode lead (not shown) and a negative electrode lead (not shown). For example, as shown in FIG. 2, 24 battery cells 111 may be stacked in parallel to each other in a front-rear direction and disposed inside the battery module 100.

In addition, the cell assembly 110 may include the plurality of battery cells 111 stacked in a left-right direction (X-axis direction). When the battery cell 111 is charged and discharged, a phenomenon in which the volume of a body of the battery case (pouch) expands or contracts may occur. For example, the entire size of the cell assembly 110 may be expanded in the left-right direction and then contracted in a central direction. In this case, while the battery case of each of the battery cells 111 constituting the cell assembly 110 swells, the adjacent other battery cell 111 may be pressurized. Accordingly, among the plurality of battery cells 111 of the cell assembly 110, the battery cell 111 that is located at an outer side in a stacking direction with respect to the center may have a more accumulated movement amount due to pressurization according to the volume expansion of each of the battery cells 111. The outermost located battery cell 111 may have the greatest amount of movement due to the swelling phenomenon. Moreover, a volume expansion amount of a middle part of the cell assembly 110 may be greater than that of an upper part or a lower part according to charging and discharging.

However, the battery cell 111 of the battery module 100 according to the present disclosure is not limited to the pouch-type battery cell 111 described above, and various types of secondary batteries disclosed at the time of filing of the present disclosure may be employed.

Moreover, the module housing 160 may be configured to accommodate the cell assembly 110 therein. The module housing 160 may include an upper plate 120, a lower plate 130, a left plate 140, and a right plate 150 to form an accommodating space for the cell assembly 110. The upper plate 120 may have a shape extending in a horizontal direction to cover an upper portion of the cell assembly 110. The left plate 140 may be coupled to a left end of the upper plate 120. The right plate 150 may be coupled to a right end of the upper plate 120.

In this regard, a downward bending portion 121 configured to be coupled to an upper end of each of the left plate 140 and the right plate 150 may be provided on each of the left and right ends of the upper plate 120. A step portion 143 configured to seat the downward bending portion 121 of the upper plate 120 may be provided on an upper portion of the left plate 140. The step portion 143 may have a step structure in which an outer surface of the upper end of the left plate 140 is recessed in an internal direction. A step portion 153 configured to seat the downward bending portion 121 of the upper plate 120 may be provided on an upper portion of the right plate 150. The step portion 153 may have a step structure in which an outer surface of an upper end of the right plate 150 is recessed in the internal direction.

In addition, the left plate 140 may have a shape extending in an up-down direction to cover a left portion of the cell assembly 110. The right plate 150 may have a shape extending in the up-down direction to cover a right portion of the cell assembly 110.

Furthermore, the left and right ends of the lower plate 130 may be coupled to the lower ends of the left plate 140 and the right plate 150, respectively. In this case, an upward bending portion 131 coupled to the lower end of each of the left plate 140 and the right plate 150 may be provided on each of the left and right ends of the lower plate 130.

A step portion 144 configured to seat the upward bending portion 131 may be provided on a lower portion of the left plate 140. The step portion 144 may have a step structure in which an outer surface of the lower end of the left plate 140 is recessed in the internal direction.

A step portion 154 configured to seat the upward bending portion 131 may be provided on a lower portion of the right plate 150. The step portion 154 may have a step structure in which an outer surface of the lower end of the left plate 140 is recessed in the internal direction.

In addition, a support portion 141 may be provided on the left plate 140. A support portion 151 may be provided on the right plate 150. The support portions 141 and 151 may be configured to pressurize at least a part of the cell assembly 110 having a relatively small volume expansion during charging and discharging. The support portions 141 and 151 may have a shape in which at least a part protrudes toward the cell assembly 110 from an inner surface facing the plurality of battery cells 111. For example, as shown in FIG. 3, the support portion 141 protruding toward the cell assembly 110 may be provided on the lower portion of the left plate 140. In addition, as shown in FIG. 4, the support portion 151 protruding toward the cell assembly 110 may be provided on the lower portion of the right plate 150.

Therefore, according to such a configuration of the present disclosure, in the present disclosure, because the support portions 141 and 151 are respectively provided on the left plate 140 and the right plate 150, when the volume expansion of the cell assembly 110 occurs, the left plate 140 and the right plate 150 may uniformly pressurize left and right surfaces of the cell assembly 110 in which the swelling phenomenon has occurred, thereby preventing the volume expansion. That is, in the present disclosure, the support portions 141 and 151 may be provided to pressurize a specific part of the cell assembly 110 with the relatively small amount of movement according to the volume expansion of the cell assembly 110. Therefore, each of the left plate 140 and the right plate 150 may uniformly pressurize the cell assembly 110 to block the volume expansion. Accordingly, the present disclosure may prevent deterioration of the battery performance and battery life of the battery module 100 because the volume expansion is relatively small due to the swelling phenomenon of the cell assembly 110 or a pressurized force is concentrated on a specific part of the cell assembly 110 on which the amount of movement is concentrated according to the volume expansion as in the related art.

Meanwhile, referring again to FIGS. 3 and 4, the support portion 141 may be provided on the lower portion of the left plate 140. The support portion 151 may be provided on the lower portion of the right plate 150. For example, as shown in FIG. 3, the support portion 141 may have a shape in which at least a part of the lower inner surface of the left plate 140 protrudes toward the cell assembly 110. In addition, the support portion 141 may have a shape extending from a front end to a rear end of the left plate 140. The protruding length of the support portion 141 may be configured to gradually increase as the support portion 141 is closer to a lower surface of the lower plate 130.

Figure 4:
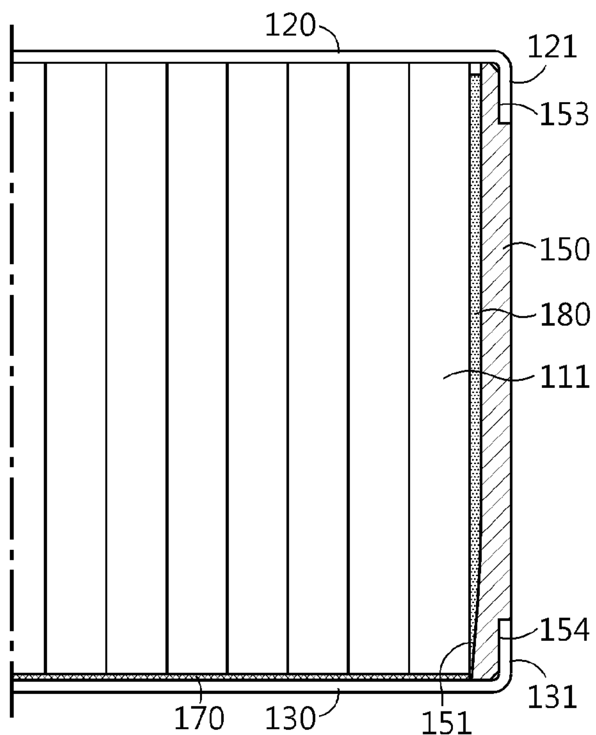

As shown in FIG. 4, the support portions 151 may have a shape in which at least a part of the lower inner surface of the right plate 150 protrudes toward the cell assembly 110. In addition, the support portion 151 may have a shape extending from a front end to a rear end of the right plate 150. The protruding length of the support portion 151 may be configured to gradually increase as the support portion 151 is closer to the lower surface of the lower plate 130.

Therefore, according to such a configuration of the present disclosure, considering that a degree of the volume expansion of the cell assembly 110 decreases toward the lower end of the cell assembly 110, each of the support portions 141 and 151 of the present disclosure may have a shape that the protruding length gradually increases as each of the support portions 141 and 151 is closer to the upper surface of the lower plate 130. Accordingly, the support portions 141 and 151 may pressurize a left surface or a right surface of the cell assembly 110 in which the swelling has occurred at a more uniform force to block the volume expansion. Accordingly, the present disclosure may prevent deterioration of the battery performance and battery life of the battery module 100 because the volume expansion is relatively large due to the swelling phenomenon of the cell assembly 110 or a pressurized force is concentrated on a specific part of the cell assembly 110 where the amount of movement is concentrated according to the volume expansion as in the related art.

Meanwhile, in describing the present disclosure, for convenience, it has been described that both the left plate 140 and the right plate 150 have a structure including the support portions 141 and 151, but the present disclosure is not limited thereto. That is, in the present disclosure, it is not excluded that the support portions 141 and 151 are provided in only any one of the left plate 140 and the right plate 150.

Figure 5:
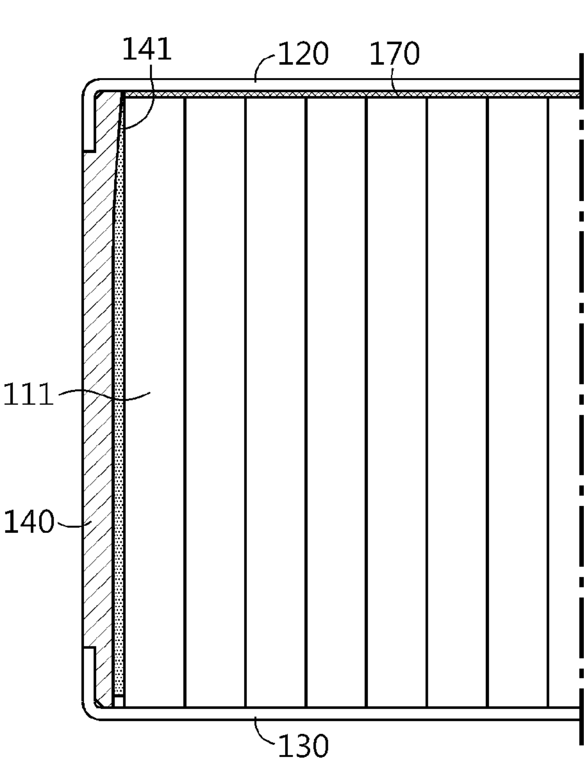
FIGS. 5 and 6 are partial front views schematically illustrating a battery module according to another embodiment of the present disclosure.
Figure 6:
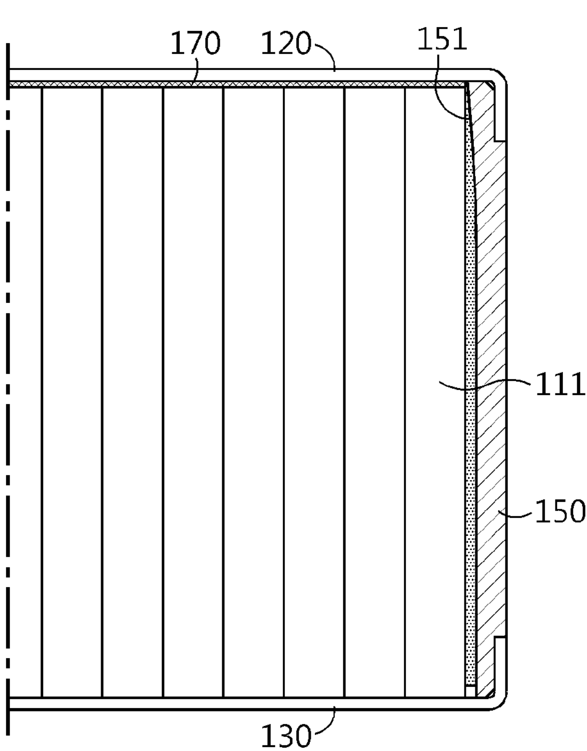

FIGS. 5 and 6 are partial front views schematically illustrating a battery module according to another embodiment of the present disclosure.

Referring to FIGS. 5 and 6, in the battery module according to another embodiment of the present disclosure, the support portion 141 may be provided on an upper portion of the left plate 140. In the support portion 141, at least a part of an upper inner surface of the left plate 140 may protrude toward the cell assembly 110. In addition, the support portion 141 may have a shape extending from a front end to a rear end of the left plate 140. The protruding length of the support portion 141 may be configured to gradually increase as the support portion 141 is closed to a lower surface of the upper plate 120.

As shown in FIG. 6, in the battery module according to another embodiment of the present disclosure, the support portion 151 may be provided on an upper portion of the right plate 150. In the support portion 151, at least a part of an upper inner surface of the right plate 150 may protrude toward the cell assembly 110. In addition, the support portion 151 may have a shape extending from a front end to a rear end of the right plate 150. The protruding length of the support portion 151 may be configured to gradually increase as the support portion 151 is closer to the lower surface of the upper plate 120.

Therefore, according to such a configuration of the present disclosure, considering that a degree of the volume expansion of the cell assembly 110 decreases toward the upper end of the cell assembly 110, each of the support portions 141 and 151 of the present disclosure may have a shape that the protruding length gradually increases as each of the support portions 141 and 151 is closer to the lower surface of the upper plate 120. Accordingly, the support portions 141 and 151 may pressurize a left surface or a right surface of the cell assembly 110 at a more uniform force to block the volume expansion. Accordingly, the present disclosure may prevent deterioration of the battery performance and battery life of the battery module 100 because the volume expansion is relatively large due to a swelling phenomenon of the cell assembly 110 or a pressurized force is concentrated on a specific part of the cell assembly 110 where an amount of movement is concentrated according to the volume expansion as in the related art.

Figure 7:
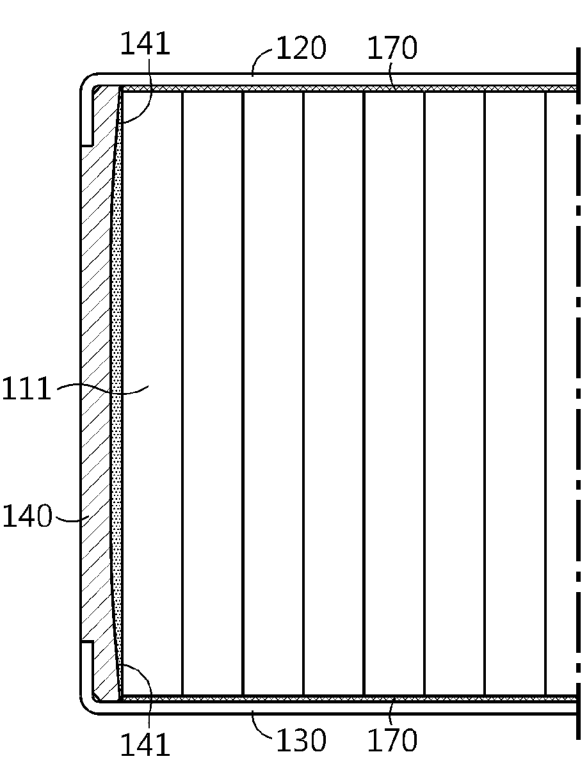
FIGS. 7 and 8 are partial front views schematically illustrating a battery module according to another embodiment of the present disclosure.
Figure 8:
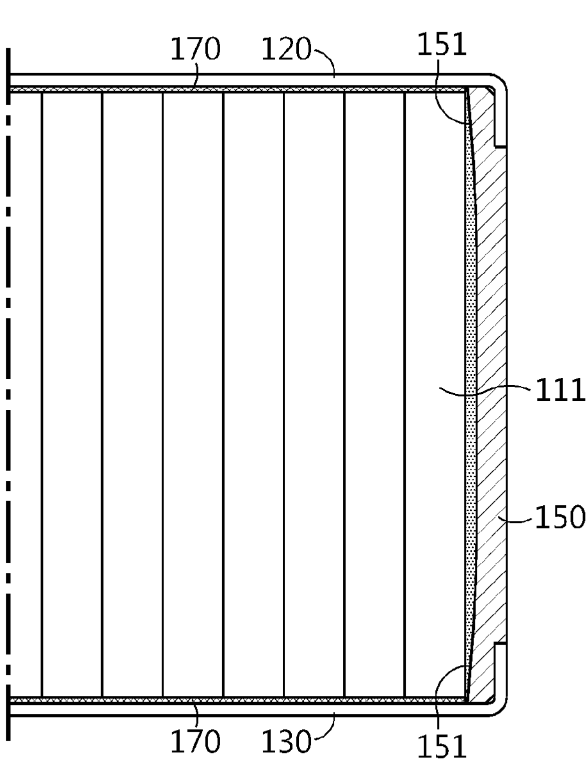

FIGS. 7 and 8 are partial front views schematically illustrating a battery module according to another embodiment of the present disclosure.

Referring to FIGS. 7 and 8, in the battery module 100 according to another embodiment of the present disclosure, the support portion 141 may be provided on each of upper and lower portions of the left plate 140. In the support portion 141, a part of each of upper and lower inner surfaces of the left plate 140 may protrude toward the cell assembly 110. The protruding length of the support portion 141 may be configured to gradually increase as the support portion 141 is closer to a lower surface of the upper plate 120.

In addition, the support portion 151 may be provided on each of upper and lower portions of the right plate 150. In the support portion 151, a part of each of upper and lower inner surfaces of the right plate 150 and the left plate 140 may protrude toward the cell assembly 110. The protruding length of the support portion 151 may be configured to gradually increase as the support portion 151 is closer to a lower surface of the upper plate 120.

In this regard, an upper surface of the cell assembly 110 may be adhered to the lower surface of the upper plate 120 of the module housing 160 by using an adhesive 170. In addition, a lower surface of the cell assembly 110 may be adhered to an upper surface of the lower plate 130 by using the adhesive 170.

Therefore, according to such a configuration of the present disclosure, the support portions 141 and 151 are provided on lower and upper ends of the left plate 140 and the right plate 150, so that the support portions 141 and 151 may pressurize a left surface or a right surface of the cell assembly 110 at a more uniform force to block a volume expansion. That is, the present disclosure includes the support portions 141 and 151 capable of pressurizing both the upper and lower ends of the cell assembly 110 when the volume expansion of the cell assembly 110 occurs, and thus each of the left plate 140 and the right plate 150 may uniformly pressurize the upper and lower ends of the cell assembly 110 along with a central portion of the cell assembly 110 to block the volume expansion. Accordingly, the present disclosure may prevent deterioration of the battery performance and battery life of the battery module 100 because the volume expansion is relatively large due to a swelling phenomenon of the cell assembly 110 or a pressurized force is concentrated on a specific part of the cell assembly 110 where an amount of movement is concentrated according to the volume expansion as in the related art.

Meanwhile, referring back to FIGS. 3 and 4 together with FIG. 2, the present disclosure may further include the adhesive 170. The adhesive 170 may have thermal conductivity. That is, the adhesive 170 may include a thermally conductive material. The thermally conductive material may include silicone polymer, epoxy, or polyurethane. The adhesive 170 may be configured to fix at least one of the upper surface and the lower surface of the cell assembly 110 to an inner surface of the module housing 160.

For example, the adhesive 170 may be interposed between the cell assembly 110 and the module housing 160. For example, as shown in FIG. 2, the adhesive 170 may be applied to the upper surface of the lower plate 130 of the module housing 160. That is, the lower portion of the cell assembly 110 may be fixed to the upper surface of the lower plate 130 by the adhesive 170.

For example, as shown in FIGS. 5 and 6, in the battery module according to another embodiment, the adhesive 170 may be applied to the lower surface of the upper plate 120 of the module housing 160. That is, the upper portion of the cell assembly 110 may be fixed to the lower surface of the upper plate 120 by the adhesive 170.

For example, as shown in FIGS. 7 and 8, in the battery module according to another embodiment, the adhesive 170 may be applied to each of the upper surface of the lower plate 130 and the lower surface of the upper plate 120 of the module housing 160. That is, the upper and lower portions of the cell assembly 110 may be fixed to the upper surface of the lower plate 130 and the lower surface of the upper plate 120 by the adhesive 170.

Therefore, according to such a configuration of the present disclosure, the present disclosure includes the thermally conductive adhesive 170 interposed between the module housing 160 and the cell assembly 110, thereby transferring heat generated from the cell assembly 110 to the module housing 160 with high thermal conductivity.

Referring back to FIGS. 3 and 4 together with FIG. 2, the support portion 141 of the left plate 140 of the battery module 100 of the present disclosure may protrude toward some of the plurality of battery cells 111 fixed by the adhesive 170 of the cell assembly 110. The support portion 141 may protrude toward a part of the outermost located battery cell 111 in a stacking direction fixed by the adhesive 170 among the plurality of battery cells 111 of the cell assembly 110.

In addition, the support portion 151 of the right plate 150 may protrude toward some of the plurality of battery cells 111 fixed by the adhesive 170 of the cell assembly 110. The support portion 151 may protrude toward a part of the outermost located battery cell 111 in the stacking direction fixed by the adhesive 170 among the plurality of battery cells 111 of the cell assembly 110.

For example, as shown in FIG. 3, the support portion 141 provided on the left plate 140 may have a shape that protrudes toward a lower portion of the outermost located battery cell 111 in a left-right direction fixed by the adhesive 170 among the plurality of battery cells 111 of the cell assembly 110.

For example, as shown in FIG. 4, the support portion 151 provided on the right plate 150 may have a shape that protrudes toward the lower portion of the outermost located battery cell 111 in the left-right direction fixed by the adhesive 170 among the plurality of battery cells 111 of the cell assembly 110.

Therefore, according to such a configuration of the present disclosure, the present disclosure protrudes toward the part of the outermost located battery cell 111 fixed by the adhesive 170, thereby effectively blocking the movement of the outermost located battery cell 111 with the largest accumulated amount of movement due to a swelling phenomenon of the cell assembly 110. Accordingly, when the lower portion of the cell assembly 110 is bonded by the adhesive 170, it is possible to effectively prevent a part of a case of the battery cell 111 fixed by an adhesive force of the adhesive 170 from being damaged (torn off) while the battery cells 111 located outside move with respect to the center along with the volume increase of the cell assembly 110 due to the swelling phenomenon.

In particular, the present disclosure may block the movement of the outermost located battery cell by the support portions 141 and 151, thereby effectively preventing a problem in which the part fixed by the adhesive 170 is torn off and bursts while the plurality of battery cells 111 are moved according to the swelling phenomenon, in the case of a pouch-type battery cell having a soft pouch with relatively small mechanical rigidity as compared to a metal case as the battery case.

Figure 9:
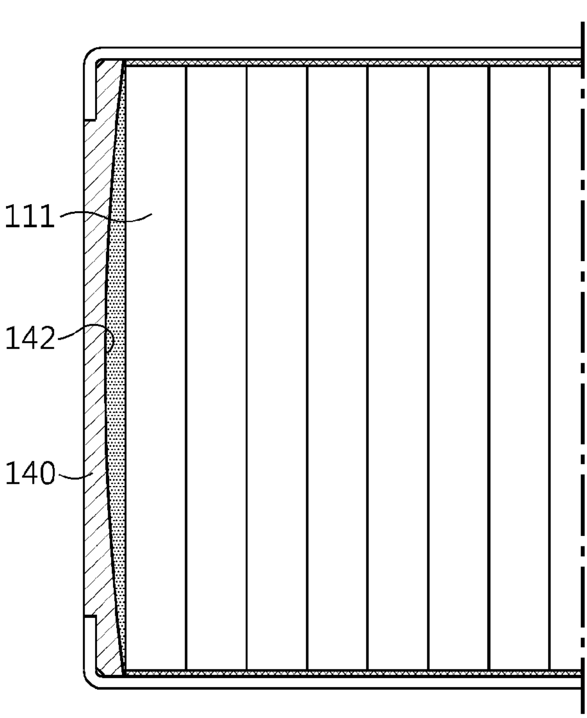
FIGS. 9 and 10 are partial front views schematically illustrating a battery module according to another embodiment of the present disclosure different from the embodiment shown in FIGS. 7 and 8.
Figure 10:
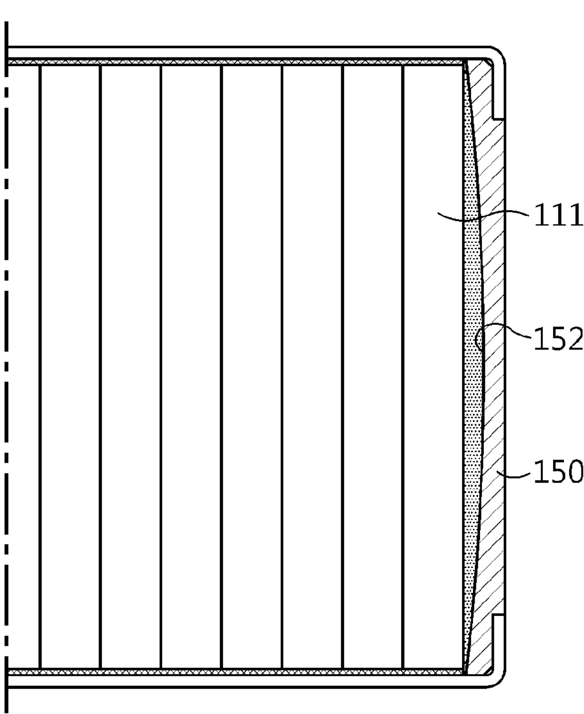

FIGS. 9 and 10 are partial front views schematically illustrating a battery module according to another embodiment of the present disclosure.

Referring to FIGS. 9 and 10, the battery module 100 according to another embodiment of the present disclosure may have a structure further including recess portions 142 and 152 in the left plate 140 and/or the right plate 150, compared with the battery module 100 of FIGS. 7 and 8.

First, the recess portion 142 of the left plate 140 may be formed when a part of the left plate 140 facing a part of the cell assembly 110 in which a relatively large volume expansion occurs is recessed during charging and discharging. That is, when a swelling phenomenon of the cell assembly 110 occurs, the recess portion 142 may be formed in consideration of a degree of volume expansion occurred for each part.

In addition, the recess portion 152 of the right plate 150 may be formed when a part facing the part of the cell assembly 110 in which the relatively large volume expansion occurs is recessed during charging and discharging. That is, when the swelling phenomenon of the cell assembly 110 occurs, the recess portion 152 may be formed in consideration of a degree of volume expansion occurred for each part.

For example, as shown in FIG. 9, a central portion of the left plate 140 may be formed to have a relatively small thickness compared to upper and lower portions thereof. As shown in FIG. 9, a central portion of the right plate 150 may be formed to have a relatively small thickness compared to upper and lower portions thereof.

Therefore, according to such a configuration of the present disclosure, the present disclosure includes the recess portions 142 and 152, thereby uniformly matching the force of the left plate 140 and the right plate 150 pressurizing a part of the cell assembly 110 with a relatively large volume expansion, and the force of the left plate 140 and the right plate 150 pressurizing the upper and lower ends of the cell assembly 110 with a relatively small volume expansion. Accordingly, the present disclosure may prevent deterioration of the battery performance and battery life of the battery module 100 because the volume expansion is relatively large due to a swelling phenomenon of the cell assembly 110 or a pressurized force is concentrated on a specific part of the cell assembly 110 where an amount of movement is concentrated according to the volume expansion as in the related art.

Meanwhile, referring back to FIGS. 2 to 4, the battery module 100 of the present disclosure may further include an elastic pad 180. The elastic pad 180 may be disposed to surround at least a part of an outer surface of the cell assembly 110. For example, as shown in FIG. 2, two elastic pads 180 may be provided between the left plate 140 and the cell assembly 110 and/or between the right plate 150 and the cell assembly 110. In addition, a plurality of elastic pads 180 may be further provided to be interposed between the plurality of battery cells 111.

In addition, the elastic pad 180 may be configured to deform according to the volume contraction and the volume expansion of the cell assembly 110. The elastic pad 180 may include a material having an elastic force. For example, the elastic pad 180 may be urethane foam, polyethylene foam, polyurethane foam, ethylene propylene diene monomer (EPDM) foam, etc.

Moreover, a part of the elastic pad 180 may be interposed between the support portion 141 of the module housing 160 and the cell assembly 110. That is, the elastic pad 180 may serve to transfer the force supported from the left plate 140 or the right plate 150 to the cell assembly 110. In this regard, the elastic pad 180 may be configured to buffer the pressurizing force in order to prevent the cell assembly 110 from being damaged by pressurization of the left plate 140 or the right plate 150. In addition, a surface of the elastic pad 180 may be softly and flexibly deformed, so that the surface of the elastic pad 180 is in direct contact with an outer surface of the cell assembly 110 instead of an inner surface of the module housing 160, thereby protecting the cell assembly 110.

Accordingly, according to such a configuration of the present disclosure, the present disclosure includes an elastic member, thereby effectively preventing damage to the cell assembly 110 that may occur when the cell assembly 110 and an internal structure of the module housing 160 collide. Furthermore, the elastic member may buffer the pressurization force of the left plate 140 and the right plate 150 pressurizing the cell assembly 110, thereby more evenly pressurizing the cell assembly 110.

Figure 11:
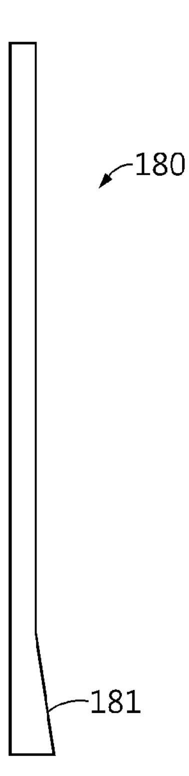
FIG. 11 is a partial front view schematically illustrating an elastic pad of a battery module battery module according to another embodiment of the present disclosure.

FIG. 11 is a partial front view schematically illustrating an elastic pad of a battery module according to another embodiment of the present disclosure.

Referring to FIG. 11, the elastic pad 180 of the battery module 100 according to another embodiment of the present disclosure may further include a pressurizing portion 181 as compared to the elastic pad 180 of FIG. 2. The pressurizing portion 181 may be configured to pressurize a part of the cell assembly 110 with a relatively small volume expansion on an inner surface facing the plurality of battery cells 111 during charging and discharging. The pressurizing portion 181 may be formed when a part of an elastic member protrudes toward the cell assembly 110.

For example, as shown in FIG. 11, when the elastic member is interposed between the left plate 140 and the cell assembly 110, the pressurizing portion 181 protruding from a lower portion in a right direction may be provided on the elastic member.

Therefore, according to such a configuration of the present disclosure, the elastic member further includes the pressurizing portion 181, and thus the present disclosure may pressurize the part of the cell assembly 110 with the relatively small volume expansion at a greater force. Accordingly, the present disclosure may pressurize a left or right surface of the cell assembly 110 on which a swelling phenomenon has occurred at a more uniform force to block the volume expansion. Accordingly, the present disclosure may prevent deterioration of the battery performance and battery life of the battery module 100 because the volume expansion is relatively large due to the swelling phenomenon of the cell assembly 110 or a pressurized force is concentrated on a specific part of the cell assembly 110 where an amount of movement is concentrated according to the volume expansion as in the related art.

Figure 12:
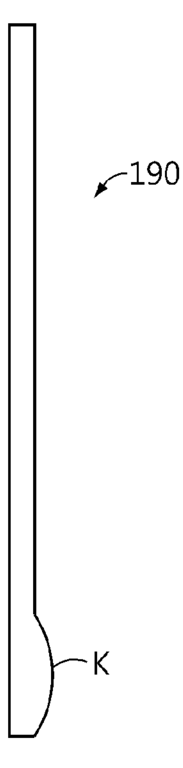
FIGS. 12 and 13 are partial front views schematically illustrating a tube of a battery module according to another embodiment of the present disclosure.
Figure 13:
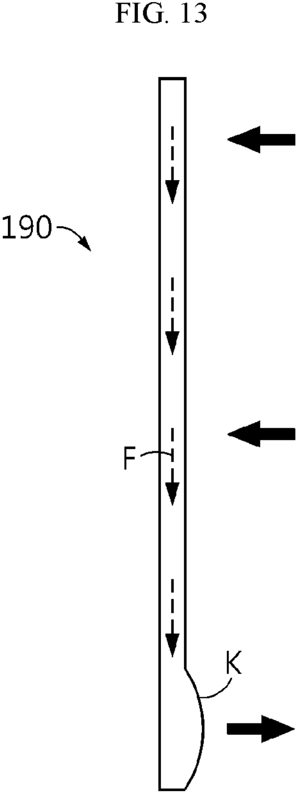

FIGS. 12 and 13 are partial front views schematically illustrating a tube of a battery module according to another embodiment of the present disclosure.

Referring to FIGS. 12 and 13 together with FIG. 2, the battery module 100 according to another embodiment of the present disclosure may include a tube 190 instead of an elastic member. A fluid F may be filled in the tube 190. For example, the fluid F may be a non-conductive insulating oil. The tube 190 may be configured to move the fluid F toward a part of the cell assembly 110 with a relatively small volume expansion.

For example, as shown in FIGS. 12 and 13, when a central portion of the cell assembly 110 in which a swelling phenomenon has occurred expands and pressurizes a central portion of the tube 190, as the fluid F embedded in the center of the tube 190 moves to a lower portion K of the tube 190, the volume of the lower portion K of the tube 190 may expand. The lower portion K of the tube 190 with the expanded volume is configured to expand the volume toward the battery cell 111 so as to pressurize a lower portion of the outermost located battery cell 111 in the cell assembly 110.

Although not shown, the two tubes 190 may be provided to be interposed between the left plate 140 and the cell assembly 110 and between the right plate 150 and the cell assembly 110, respectively.

Therefore, according to such a configuration of the present disclosure, the present disclosure includes the tube 190, thereby pressurizing the part of the cell assembly 110 with the relatively small volume expansion at a greater force. Accordingly, the present disclosure may pressurize a left or right surface of the cell assembly 110 on which the swelling phenomenon has occurred at a more uniform force to block the volume expansion. Accordingly, the present disclosure may prevent deterioration of the battery performance and battery life of the battery module 100 because the volume expansion is relatively large due to the swelling phenomenon of the cell assembly 110 or a pressurized force is concentrated on a specific part of the cell assembly 110 where an amount of movement is concentrated according to the volume expansion as in the related art.

Meanwhile, a battery pack (not shown) according to an embodiment of the present disclosure may include at least two of the battery modules 100. In addition, the battery pack may further include a pack housing (not shown) including an accommodation space for accommodating at least two of the battery modules 100. In addition, the battery pack may further include various devices controlling charging and discharging of the battery module 100, such as a battery management system (BMS), a current sensor, a fuse, etc.

Meanwhile, the battery pack according to an embodiment of the present disclosure may be included in a vehicle such as an electric vehicle or a hybrid vehicle. That is, the vehicle according to an embodiment of the present disclosure may have a battery pack including the at least one battery pack according to an embodiment of the present disclosure described above in a vehicle body.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:

a cell assembly comprising a plurality of battery cells stacked in a first direction; and a module housing configured to accommodate the cell assembly therein, wherein the module housing comprises an upper plate covering an upper portion of the cell assembly, a left plate, the left plate defining a left exterior of the battery module and covering a left portion of the cell assembly, a right plate, the right plate defining a right exterior of the battery module and covering a right portion of the cell assembly, and a lower plate covering a lower portion of the cell assembly, wherein at least one of the left plate and the right plate comprises a support portion having a shape protruding toward the cell assembly from an inner surface facing the plurality of battery cells to pressurize at least a part of the cell assembly having a smaller volume expansion than a remainder of the cell assembly, wherein the battery module further comprises an elastic pad interposed between the cell assembly and at least one of the left plate and the right plate, wherein at least one of the upper plate and the lower plate includes bent portions at first and second ends, wherein at least one of the left plate and the right plate includes step portions at first and second ends, wherein the step portions are located on a side of the at least one of the left plate and the right plate facing away from the cell assembly, and wherein the step portions are configured to seat the bent portions.

2. The battery module of claim 1, wherein the support portion is provided on at least one of a lower portion and an upper portion of at least one of the left plate and the right plate, and wherein the support portion is configured to have a shape that a protruding length gradually increases as the support portion is closer to the lower plate or the upper plate.

3. The battery module of claim 1, further comprising an adhesive having a thermal conductivity and applied to fix one or more of an upper surface and a lower surface of the cell assembly to an inner surface of the module housing.

4. The battery module of claim 3, wherein the support portion protrudes toward a part of a first battery cell of the plurality of battery cells, the first battery cell being located at an outermost side in the first direction and fixed by the adhesive.

5. The battery module of claim 1, wherein the module housing comprises a recess portion formed as a part of the module housing facing a part of the cell assembly having a volume expansion during charging and discharging which is larger than a remainder of the cell assembly.

6. The battery module of claim 1, wherein the elastic pad is disposed to surround at least a part of an outer surface of the cell assembly and configured to be deformed according to a volume contraction and a volume expansion of the cell assembly, and wherein at least a part of the elastic pad is interposed between the support portion of the module housing and the cell assembly.

7. The battery module of claim 6, wherein the elastic pad comprises a pressurizing portion having a part formed to protrude toward the cell assembly to pressurize the part of the cell assembly with the smaller volume expansion, on an inner surface facing the plurality of battery cells, during charging and discharging.

8. The battery module of claim 1, further comprising a tube filled with a fluid, the tube configured to allow the fluid to move toward the part of the cell assembly with the smaller volume expansion, during charging and discharging.

9. The battery module of claim 1, wherein the support portion is a concave surface of at least one of the left plate and the right plate facing the cell assembly.

10. The battery module of claim 1, wherein the inner surface of at least one of the left plate and right plate has a flat first portion, and a second portion extending from the first portion in a direction toward at least one of the upper plate and the lower plate and protruding further toward the cell assembly.

11. The battery module of claim 1, wherein at least a part of the inner surface of at least one of the left plate and the right plate has a curved shape.

12. The battery module of claim 1, wherein the elastic pad is in direct contact with a battery cell being located at an outermost side of the cell assembly.

13. A battery pack comprising at least one battery module according to claim 1.

14. A vehicle comprising at least one battery module according to claim 1.

* * * * *